(12) United States Patent
Oshima et al.

(10) Patent No.: US 9,346,492 B2
(45) Date of Patent: May 24, 2016

(54) OFF-ROAD VEHICLE

(71) Applicant: HONDA MOTOR CO., LTD., Tokyo (JP)

(72) Inventors: Tadashi Oshima, Dublin, OH (US); Yasuo Hanafusa, Tochigi-ken (JP); Naoki Kuwabara, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/475,674

(22) Filed: Sep. 3, 2014

(65) Prior Publication Data

US 2015/0061274 A1 Mar. 5, 2015

(30) Foreign Application Priority Data

Sep. 5, 2013 (JP) ................................. 2013-184437

(51) Int. Cl.
| | |
|---|---|
| *B62D 21/11* | (2006.01) |
| *B60G 7/02* | (2006.01) |
| *B60G 3/20* | (2006.01) |
| *B60G 13/00* | (2006.01) |
| *B60G 7/00* | (2006.01) |

(52) U.S. Cl.
CPC ........ *B62D 21/11* (2013.01); *B60G 3/20* (2013.01); *B60G 7/001* (2013.01); *B60G 7/02* (2013.01); *B60G 13/003* (2013.01); *B60G 2200/144* (2013.01); *B60G 2204/129* (2013.01); *B60G 2204/143* (2013.01); *B60G 2206/124* (2013.01); *B60G 2300/124* (2013.01); *B60G 2300/13* (2013.01)

(58) Field of Classification Search
CPC ....... B62D 21/11; B60G 7/001; B60G 13/003; B60G 7/02; B60G 3/20; B60G 2204/143; B60G 2200/144; B60G 2300/124; B60G 2206/124; B60G 2206/2204; B60G 2206/129; B60G 2300/13

See application file for complete search history.

(56) References Cited

U.S. PATENT DOCUMENTS

| | | | | |
|---|---|---|---|---|
| 6,945,548 | B2 * | 9/2005 | Dudding et al. ........ | 280/124.157 |
| 7,461,851 | B2 * | 12/2008 | Yamamura et al. .... | 280/124.135 |
| 7,690,661 | B2 * | 4/2010 | Tsuruta et al. ......... | 280/124.135 |
| 7,770,907 | B2 * | 8/2010 | Shimizu et al. ........ | 280/124.134 |
| 7,802,816 | B2 * | 9/2010 | McGuire ....................... | 280/788 |
| 7,934,735 | B2 * | 5/2011 | Kuwabara .............. | 280/124.134 |
| 7,950,486 | B2 * | 5/2011 | Van Bronkhorst et al. ........................... | 180/89.11 |
| 7,992,662 | B2 * | 8/2011 | King et al. .................. | 180/65.22 |
| 8,029,021 | B2 * | 10/2011 | Leonard et al. ............... | 280/785 |
| 2007/0182120 | A1 * | 8/2007 | Tonoli et al. .......... | 280/124.142 |
| 2009/0294199 | A1 * | 12/2009 | Mcguire .................. | 180/312 |
| 2009/0301830 | A1 * | 12/2009 | Kinsman et al. ............. | 188/289 |
| 2012/0018973 | A1 * | 1/2012 | Fujii et al. .............. | 280/124.134 |
| 2012/0319389 | A1 * | 12/2012 | Takahashi et al. ............ | 280/781 |

FOREIGN PATENT DOCUMENTS

JP        4606290 B2     10/2010

* cited by examiner

*Primary Examiner* — Darlene P Condra
(74) *Attorney, Agent, or Firm* — Honda Patents & Technologies North America, LLC; Suzanne B. Gagnon

(57) ABSTRACT

An off-road vehicle is provided with a body frame that supports a final drive unit and a rear suspension, the rear suspension that supports rear wheels with an upper arm and a lower arm and absorbs shock with a rear cushion unit disposed between the rear wheels and the body frame, and a drive shaft that transmits a driving force from the final drive unit to the rear wheels. The body frame that configures generally rectangular parallelepiped sides enclosing the area around the final drive unit is provided with a front rear side frame. The front rear side frame vertically extends the left and right of one side of either the front side or the back side of the final drive unit and supports the upper arm, the lower arm, and the rear cushion unit.

16 Claims, 11 Drawing Sheets

OFF-ROAD VEHICLE

CROSS REFERENCES TO RELATED APPLICATIONS

The present application claims priority under 35 U.S.C. §119 to Japanese Patent Application No. 2013-184437, filed Sep. 5, 2013, entitled "All Terrain Vehicle," the contents of which are incorporated herein by reference in their entirety.

BACKGROUND

The present disclosure relates to an off-road vehicle provided with a suspension device.

Conventionally, off-road vehicles are known that have a pair of frame members extending in a vertical direction disposed on a vehicle rear frame part, an upper arm and a lower arm attached to these frame members with an ability to swing vertically, and a cushion unit located between the rear frame and the upper arm. The rear frame couples the pair of frame members in the front and back. In a lower area of the cushion unit, a drive shaft (axle shaft) that transfers power to the rear wheels is disposed to overlap with the cushion unit from a planar view. In such an off-road vehicle, disposing the cushion unit upward, so as to avoid the drive shaft, facilitates a higher center of gravity position for the overall vehicle.

To lower the center of gravity position of the vehicle, it is desirable to lower as much as possible the height of a bed and seat in the passenger compartment of the vehicle, which is the body structure above the suspension. Further, improving the mounting precision of the overall suspension and improving the strength and rigidity of the suspension support structure of the vehicle are desired to increase driving performance of the vehicle.

SUMMARY

In light of the above, the present disclosure provides an off-road vehicle that has a low center of gravity of the body, while also enabling improved mounting precision of the overall suspension and improved strength and rigidity of the suspension support structure.

In one aspect, an off-road vehicle is provided with a body frame supporting a final drive unit and a suspension device; the suspension device that supports a driving wheel with an upper arm and a lower arm so as to be vertically moveable, and absorbs shock with a cushion unit disposed between a driving wheel and the body frame; and a drive shaft that transmits a driving force extending from the final drive unit to the driving wheel. The body frame configuring generally rectangular parallelepiped sides enclosing an area around the final drive unit includes a frame member. The frame member that vertically extends left and right of one side of either a front side or a back side of the final drive unit supports the upper arm, the lower arm, and the cushion unit.

With the above configuration, the frame member is formed in a U-shaped cross-section opening to the outside in a vehicle width direction, and may be configured so that coupling shafts coupling the upper arm, the lower arm, and the cushion unit are each inserted across a pair of opposing walls of the U-shape.

Further, a top end of the frame member is coupled to a cross member. The cross member includes a U-shaped cross-section opening downward and extending left and right connecting a pair of left and right upper frame members that extend longitudinally above left and right sides of the final drive unit.

An attachment portion of the cushion unit may be provided in a location where the frame member and the cross member respectively overlap.

Further, with the above configuration, the attachment portion of the cushion unit may be provided in a position at substantially the same height as a lower surface but more to the inner side than the inner surface in the vehicle width direction of the pair of left and right upper frame members.

Also with the above configuration, a portion adjacent to the cushion unit of the upper arm may be bent to the drive shaft side when viewed from the top surface.

In another aspect, a body frame for supporting a suspension device of a vehicle includes a side frame and a cross member attached to a top end portion of the side frame. The side frame includes two side walls, a bottom wall connecting the side walls, and attachment portions to attach an upper arm of the suspension device, a lower arm of the suspension device, and a cushion unit of the suspension device. The cross member includes two side walls and a top wall connecting the side walls. The cushion unit attachment portion is provided in a location where the side frame and the cross member overlap to attach the cushion unit to the side frame and the cross member.

In still another aspect, a suspension support structure of a vehicle includes a suspension device and a body frame supporting the suspension device. The suspension device includes an upper arm and a lower arm supporting a wheel of a vehicle and vertically movable on the body frame, and a cushion unit absorbing shock and disposed between the body frame and the wheel. The body frame includes a side frame to which the upper arm, the lower arm, and the cushion device attach. Each arm has a first end attached to the side member and a second end supporting the wheel, and the cushion unit has a first end attached to the side member and a second end attached to the lower arm.

With the present disclosure, the body frame configuring generally rectangular parallelepiped sides enclosing the area around the final drive unit is provided with a frame member; and the frame member, which vertically extends the left and right of one side of either the front side or the back side of the final drive unit, supports the upper arm, the lower arm, and the cushion unit. Thus, the drive shaft and the cushion unit can be positioned off-set in the vehicle longitudinal direction, and the attachment position of the cushion unit can be lower. Further, by lowering the attachment position of the cushion unit, the seat and bed provided on the upper side of the attachment position can be lowered. Therefore, a low center of gravity can be achieved for the overall vehicle. In addition, by attaching the upper arm, the lower arm, and the cushion unit to one frame member, the mounting precision of the entire suspension can be improved compared to prior art where the cushion unit is attached to a member separate from the frame member with the upper arm and the lower arm attached. Because the suspension support structure is simple in this manner, the strength and rigidity necessary for the suspension support structure are easily achieved.

Further, the frame member is formed in a U-shaped cross-section opening to the outside in a vehicle width direction, and each coupling shaft that couples the upper arm, the lower arm and the cushion unit is inserted across a pair of opposing walls of the U-shape. Therefore, an attachment structure of the upper arm, the lower arm and the cushion unit can be easily formed, and cost can be suppressed by merely inserting the coupling shaft into the opposing walls which forms the U-shape of the frame member.

Further, the top end of the frame member is coupled to a U-shaped cross-sectional cross member that opens downward and extends left and right to connect a pair of left and right upper arm members extending longitudinally above the left and right sides of the final drive unit, and an attachment portion of the cushion unit is provided in a location where the frame member and the cross member respectively overlap. Thus, a load of the cushion unit can be supported in a high strength location where the frame member and the cross member overlap. Therefore, deformation of the body frame can be suppressed.

Further, the attachment portion of the cushion unit is provided in a position at substantially the same height as a lower surface but more to the inner side than the inner surface in the vehicle width direction of the pair of left and right upper frame members. Therefore, the length of the cushion unit can be lengthened, and suspension performance can be improved.

Further, because a portion adjacent to the cushion unit of the upper arm is bent to the drive shaft side when viewed from the top surface, the cushion unit can get close to the center of the wheel in the vehicle longitudinal direction, and suspension performance can be improved.

DETAILED DESCRIPTION

Embodiments of the present disclosure are described below with reference to drawings. Note that in the description, the front and back, left and right, and top and bottom directions are the same as the directions relating to the vehicle unless specifically mentioned. Furthermore, reference symbol FR illustrated in each figure illustrates the front of the vehicle body, reference symbol UP reference symbol illustrates the upper part of the vehicle body, and reference symbol LE illustrates the left side of the vehicle body.

Figure 1:
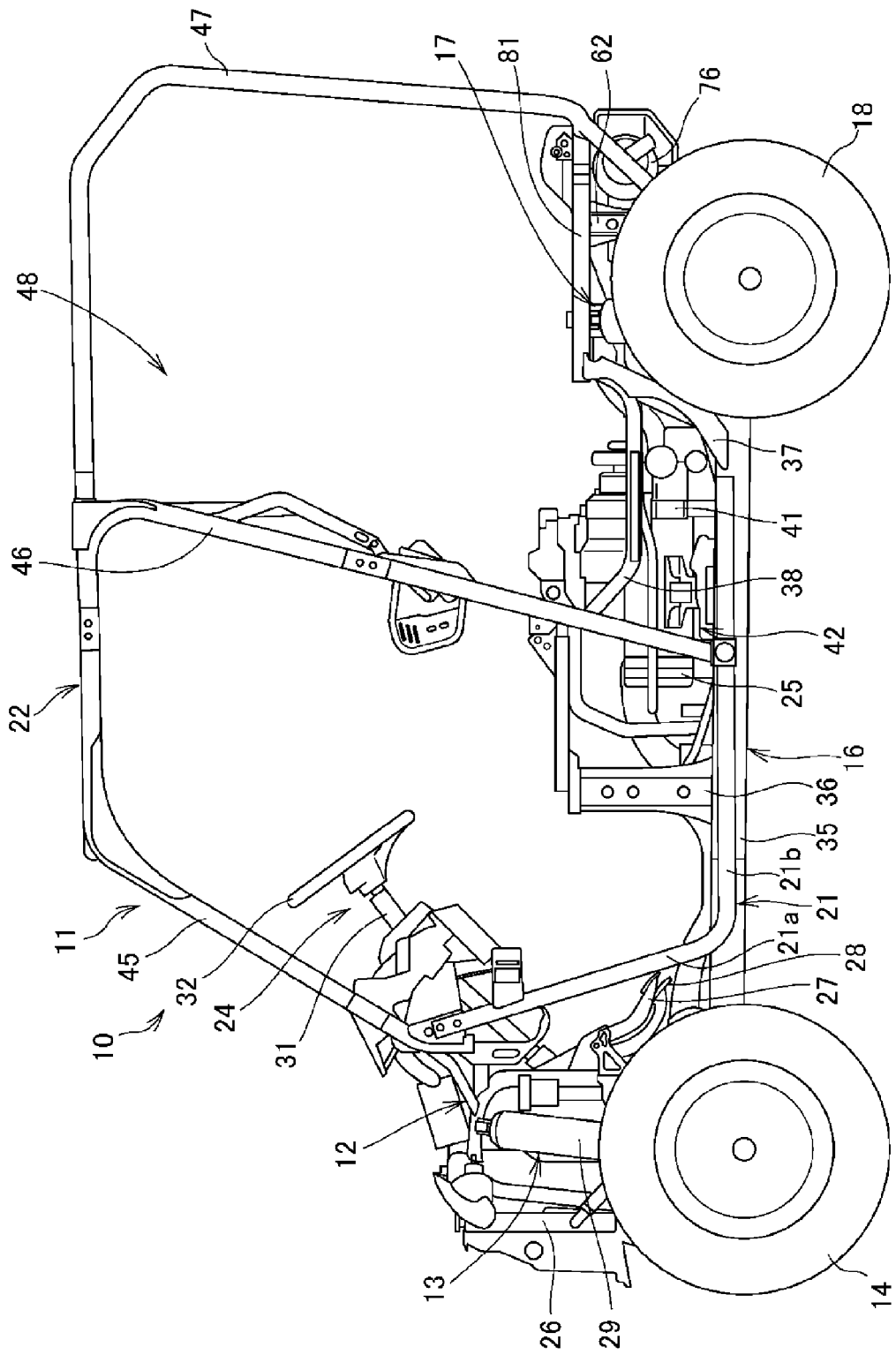
FIG. 1 is a left side view illustrating an off-road vehicle of an embodiment of the present disclosure.

FIG. 1 is a left side view illustrating an off-road vehicle 10 of an embodiment of the present disclosure. The off-road vehicle 10 is provided with a body frame 11 that becomes the frame, a pair of left and right front wheels 14 and 14 (only the front wheel 14 of the viewable side is illustrated) that are supported by a front frame 12 configuring the front portion of the body frame 11 via a front suspension 13, and rear wheels 18 and 18 supported by a rear frame 16 configuring the rear portion of the body frame 11 via a rear suspension 17.

The body frame 11 is provided with the front frame 12, the rear frame 16 connected to the back end portion of the front frame 12, a left and right pair of side frames 21 and 21 (only the side frame 21 of the viewable side is illustrated) attached to a side part of the front frame 12 and the rear frame 16, and an upper frame 22 attached so as to extend to the upper side from the front frame 12, the rear frame 16, and the side frame 21.

In addition to the front suspension 13, the front frame 12 is provided with a steering mechanism 24 that steers the front wheels 14, a radiator 26 that cools an engine 25 that becomes the driving source, a brake pedal 27, and an accelerator pedal 28. Note that reference symbol 29 is a front cushion unit configuring the front suspension 13. The steering mechanism 24 is provided with a steering shaft 31 rotatably supported by the front frame 12, and a steering wheel 32 attached to the end portion of the steering shaft 31.

The rear frame 16 is provided with a left and right pair of middle lower main frames 35 and 35 (only the middle lower main frame 35 of the viewable side is illustrated) connected to the left and right back end portions of the front frame 12, and a left and right pair of middle side frames 36 and 36 (only the middle side frame 36 of the viewable side is illustrated) raised from the vicinity of the front end portion of the middle lower main frames 35 and 35. The rear frame 16 is also provided with a left and right pair of rear side inclined frames 37 and 37 (only the rear side inclined frame 37 of the viewable side is illustrated) raised rearward and obliquely upward from the vicinity of the rear wheels 18 of the middle lower main frames 35 and 35, and a left and right pair of middle upper main frames 38 and 38 (only the middle upper main frame 38 of the viewable side is illustrated) that connect the front and back of each top end portion of the middle side frame 36 and the rear side inclined frame 37.

The left and right middle lower main frames 35 and 35 and the left and right middle upper main frames 38 and 38 are each connected by a plurality of cross members (not illustrated) extending in the vehicle width direction. A power unit 42 made up of the engine 25 and a transmission 41 is supported by the rear frame 16. A bench seat (not illustrated) where the passengers sit is provided in the front of the left and right middle upper frames 38 and 38.

The side frame 21 is configured with a down frame portion 21a extending downward and obliquely rearward from the upper back portion of the front frame 12 and a side frame portion 21b extending rearward from the lower end portion of the down frame portion 21a. A front seat door (not illustrated) is attached to the down frame portion 21a. The side frame portion 21b is positioned on the outside of the middle lower main frame 35. A side step (not illustrated) is provided between the side frame portion 21b and the middle lower main frame 35.

The upper frame 22 is provided with a left and right pair of front pillars 45 and 45 (only the front pillar 45 of the viewable side is illustrated) extending upward and obliquely rearward from the back upper portion of the front frame 12, a left and right pair of center pillars 46 and 46 (only the center pillar 46 of the viewable side is illustrated) extending upward and obliquely rearward from the intermediate part of the side frames 21 and 21 sides, and a left and right pair of rear pillars 47 and 47 (only the rear pillar 47 of the viewable side is illustrated) extending upward from the back end portion of the rear frame 16. Respective cross pipes are used to connect between the top end portions of the left and right front pillars 45 and 45, between the intermediate parts and the top end portions of the left and right center pillars 46 and 46, and between the top end portions of the left and right rear pillars 47 and 47. The space enclosed by the above-described front frame 12, the rear frame 16, and the upper frame 22 forms a cabin 48 where the passengers ride.

Figure 2:
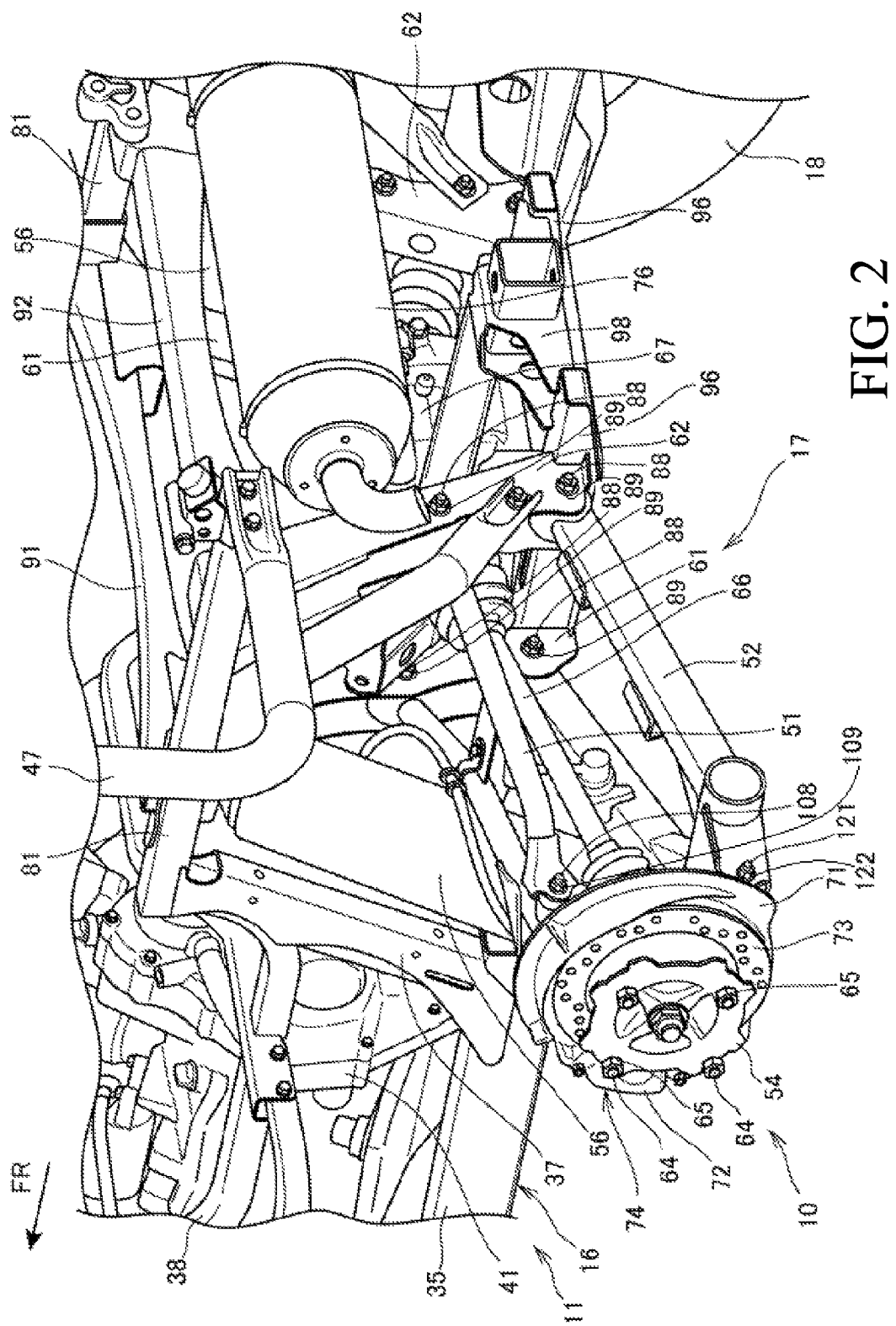
FIG. 2 is a perspective view illustrating the rear portion of the off-road vehicle.

FIG. 2 is a perspective view illustrating the rear portion of the off-road vehicle 10. The rear suspension 17 that suspends rear wheels 18 (see FIG. 1) is configured with an upper arm 51 and a lower arm 52 supported so as to be vertically movable on the rear frame 16, a knuckle (not illustrated in FIG. 2) swingably supported on respective tip end portions of the upper arm 51 and the lower arm 52, a hub 54 rotatably attached to the knuckle, and a rear cushion unit 56 with the upper end swingably supported by the rear frame 16 and the lower end swingably coupled to the lower arm 52.

Respective inner end portions of the upper arm 51 and the lower arm 52 are swingably supported by a pair of front rear side frames 61 and back rear side frames 62 that configure the rear frame 16. The hub 54 is provided with a plurality of stud bolts 64, and the rear wheels 18 (see FIG. 1) are secured to the hub 54 by the stud bolts 64 and wheel nuts 65.

A final drive unit (final reduction gear) 67 is coupled to the rear wheels 18 via a drive shaft 66. Further, the transmission 41 is coupled to the final drive unit 67 via a propeller shaft (not illustrated). The final drive unit 67 is a device that combines a deceleration mechanism that decelerates power from the transmission 41 and transmits it to the drive shaft 66, and a differential gear that distributes power to the left and right drive shafts 66 and 66.

A circular plate 71 is attached to the knuckle, and a brake caliper 72 is attached to the plate 71. A brake disc 73 is integrally attached to the hub 54. The brake caliper 72 and the brake disk 73 configure a rear disk brake 74 that brakes the rear wheels 18. Note that reference symbol 76 is a muffler connected to the engine 25 via an exhaust pipe (not illustrated). Reference symbol 88 is a coupling shaft coupling the upper arm 51 and the lower arm 52 to the front rear side frame 61 and to the back rear side frame 62, and 89 is a nut screwed to the end portion of the coupling shaft 88. Reference symbol 108 is a coupling shaft coupling the knuckle to the upper arm 51, and 109 is a nut screwed to the end portion of the coupling shaft 108. Reference symbol 121 is a coupling shaft coupling the knuckle to the lower arm 52, and 122 is a nut screwed to the end portion of the coupling shaft 121.

Figure 3:
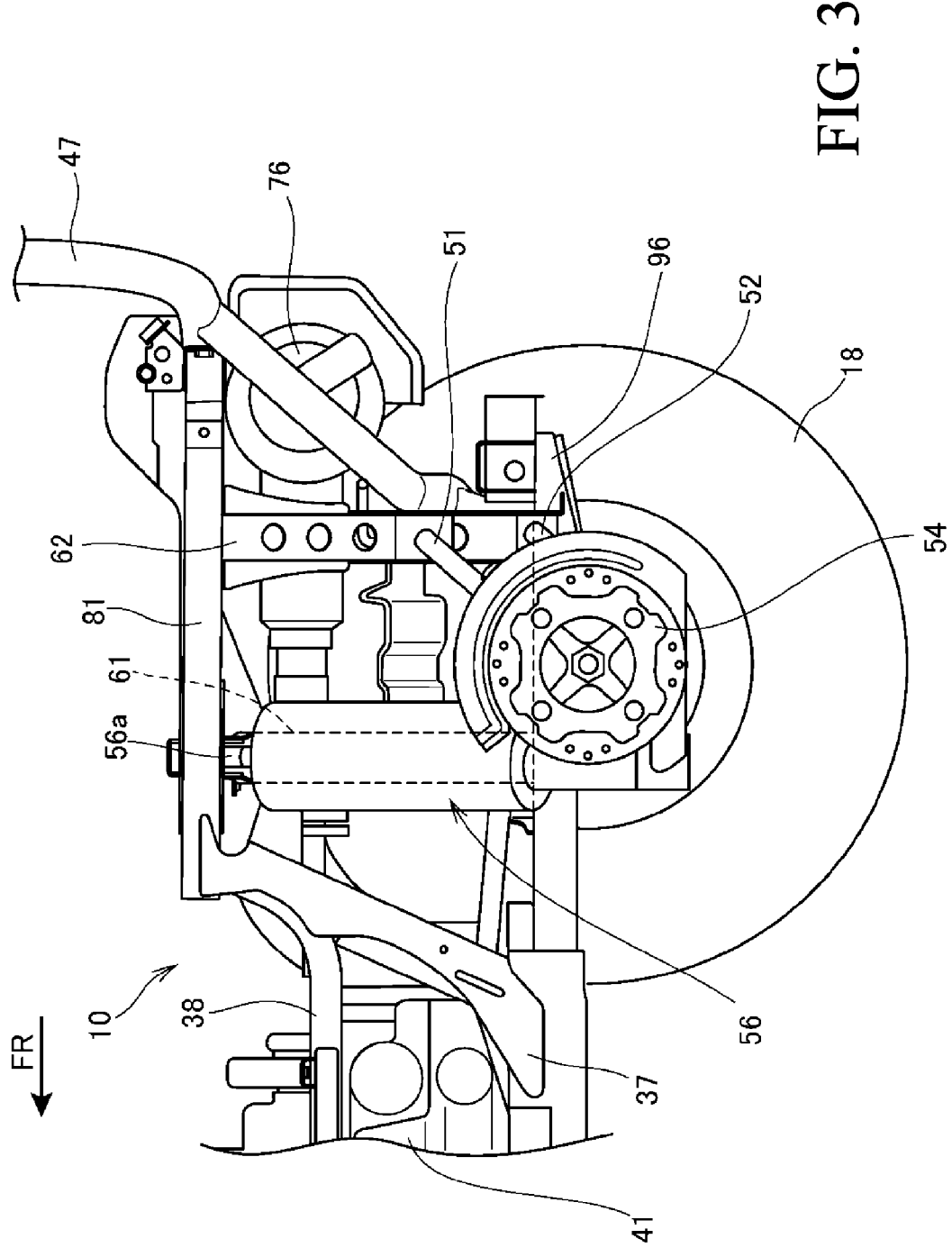
FIG. 3 is a left side view illustrating the rear portion of the off-road vehicle.

FIG. 3 is a left side view illustrating the rear portion of the off-road vehicle 10. An upper end portion 56a of the rear cushion unit 56 is swingably supported by the upper end portion of the front rear side frame 61, and the rear cushion unit 56 overlaps the front rear side frame 61 when viewed from the side.

The front end portion of a left and right pair of rear upper main frames 81 and 81 (only the rear upper main frame 81 of the viewable side is illustrated) is connected to the connecting portion of the upper end of the rear side inclined frames 37 and 37 (only the rear side inclined frame 37 of the viewable side is illustrated) and the back end portion of the middle upper main frames 38 and 38 (only the middle upper main frame 38 of the viewable side is illustrated). The rear upper main frames 81 and 81 extend from the front end portion thereof rearward.

Figure 4:
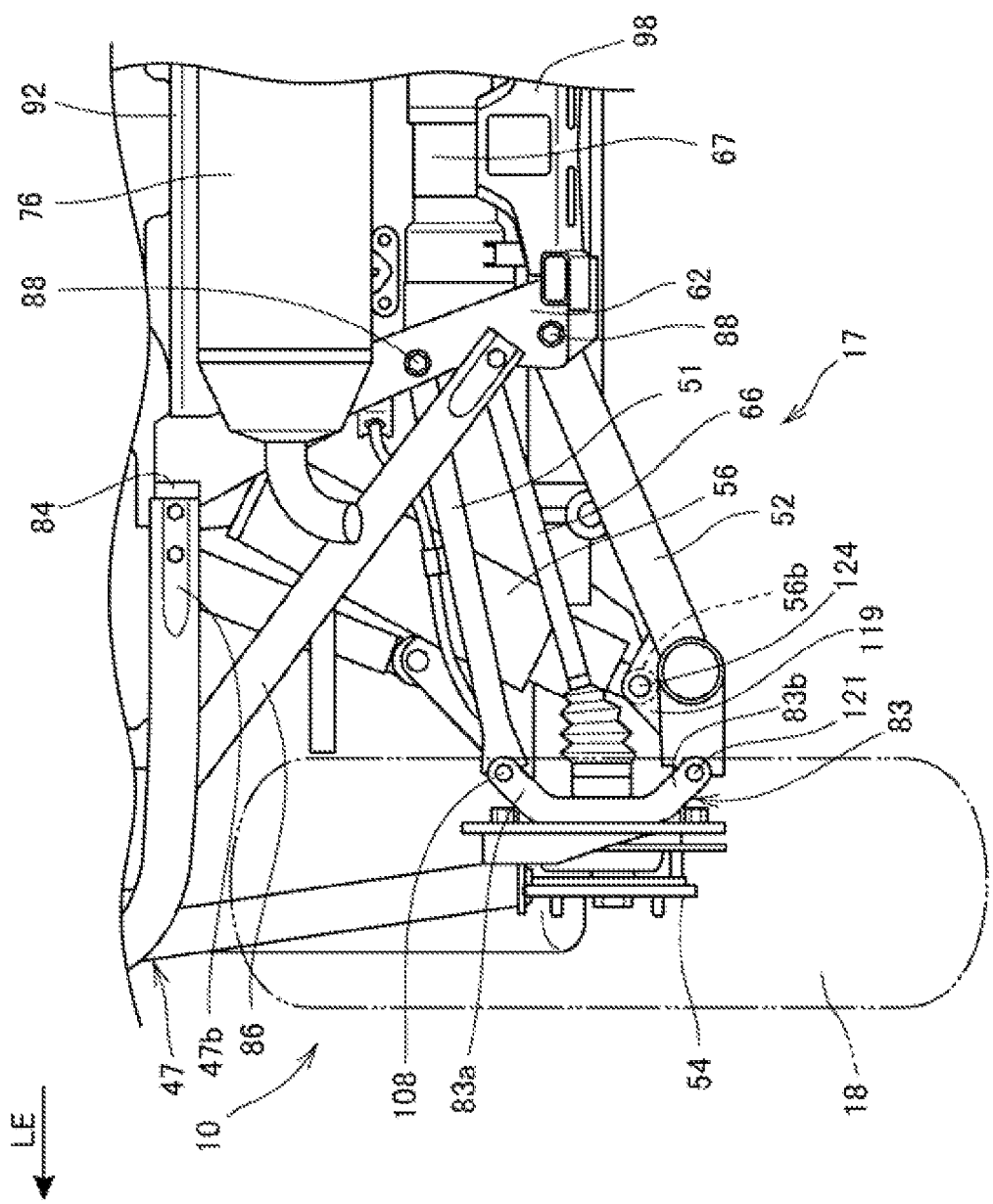
FIG. 4 is a main section rear view illustrating the rear portion of the off-road vehicle.

FIG. 4 is a main section rear view illustrating the rear portion of the off-road vehicle 10. One end of each of the upper arm 51 and the lower arm 52 that configure the rear suspension 17 is swingably attached to the front rear side frame 61 and the back rear side frame 62. Furthermore, the other end of the upper arm 51 is swingably coupled to an upper extended portion 83a of a knuckle 83, and the other end of the lower arm 52 is swingably coupled to a lower extended portion 83b of the knuckle 83. The drive shaft 66 that transmits a driving force from the final drive unit 67 to the knuckle 83 is positioned between the upper arm 51 and the lower arm 52 described above.

A lower end portion 56b of the rear cushion unit 56 is swingably coupled to the tip end side (knuckle 83 side) of the lower arm 52. A lower end portion 47b of the rear pillar 47 is attached to the back end portion of the rear upper main frame 81 (see FIG. 2) via a bracket 84. Further, a reinforcing pipe 86 extends inward and obliquely downward in the vehicle width direction from the rear pillar 47, and the tip end portion of the reinforcing pipe 86 is attached to the lower portion of the back rear side frame 62.

Figure 5:
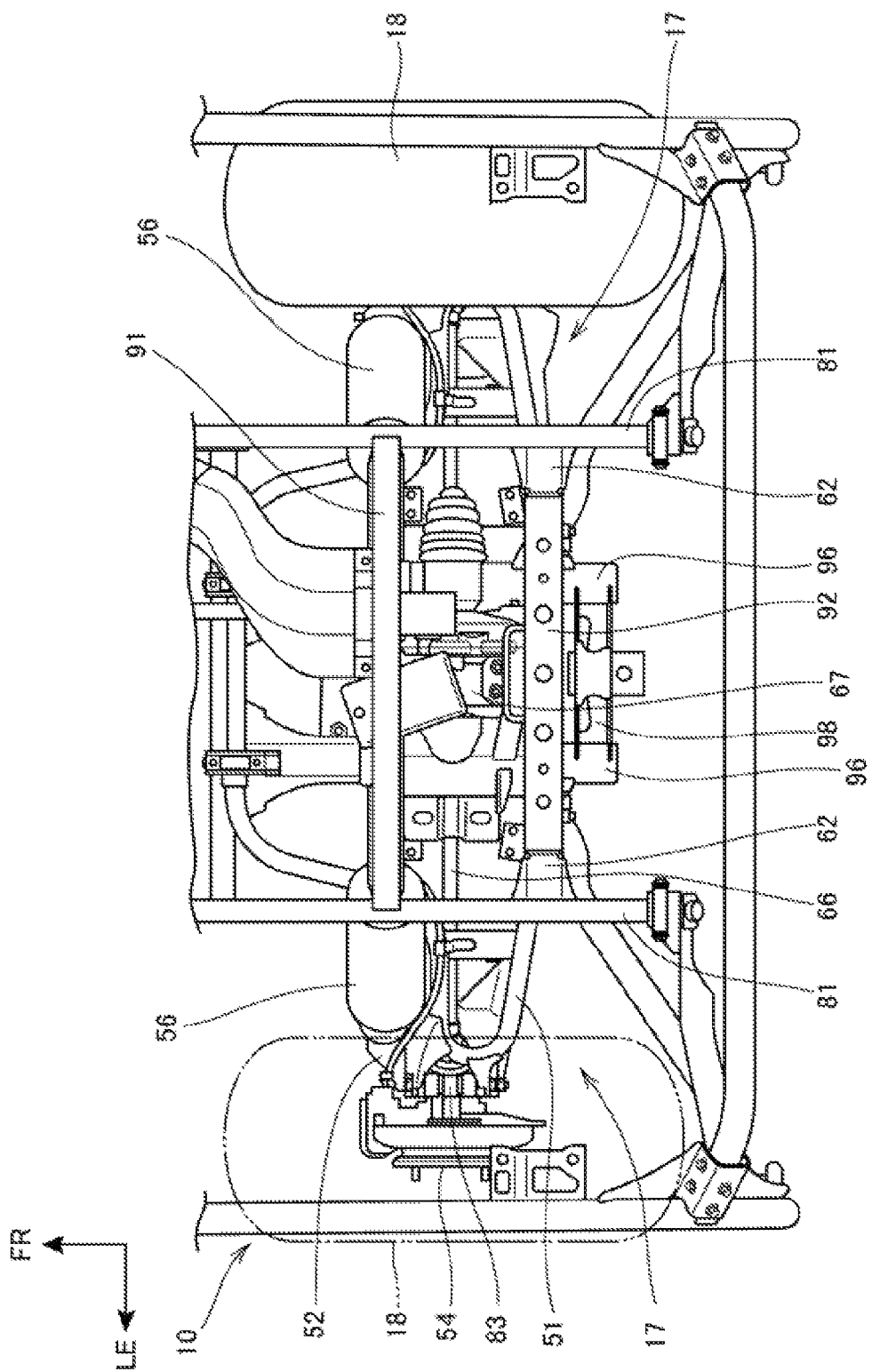
FIG. 5 is a top plan view illustrating the rear portion of the off-road vehicle.

FIG. 5 is a plan view illustrating the rear portion of the off-road vehicle 10. The rear cushion unit 56 extends from the front rear side frame 61 (see FIG. 3), passes the front side of the upper arm 51 and the drive shaft 66, and is coupled to the front of the lower arm 52. The left and right rear upper main frames 81 and 81 are connected by a front rear cross member 91 that extends in the vehicle width direction in a position overlapping the upper end portion of the rear cushion unit 56. Furthermore, the upper end portions of each the left and right back rear side frames 62 and 62 are connected by a back rear cross member 92 that extends in the vehicle width direction.

Figure 6:
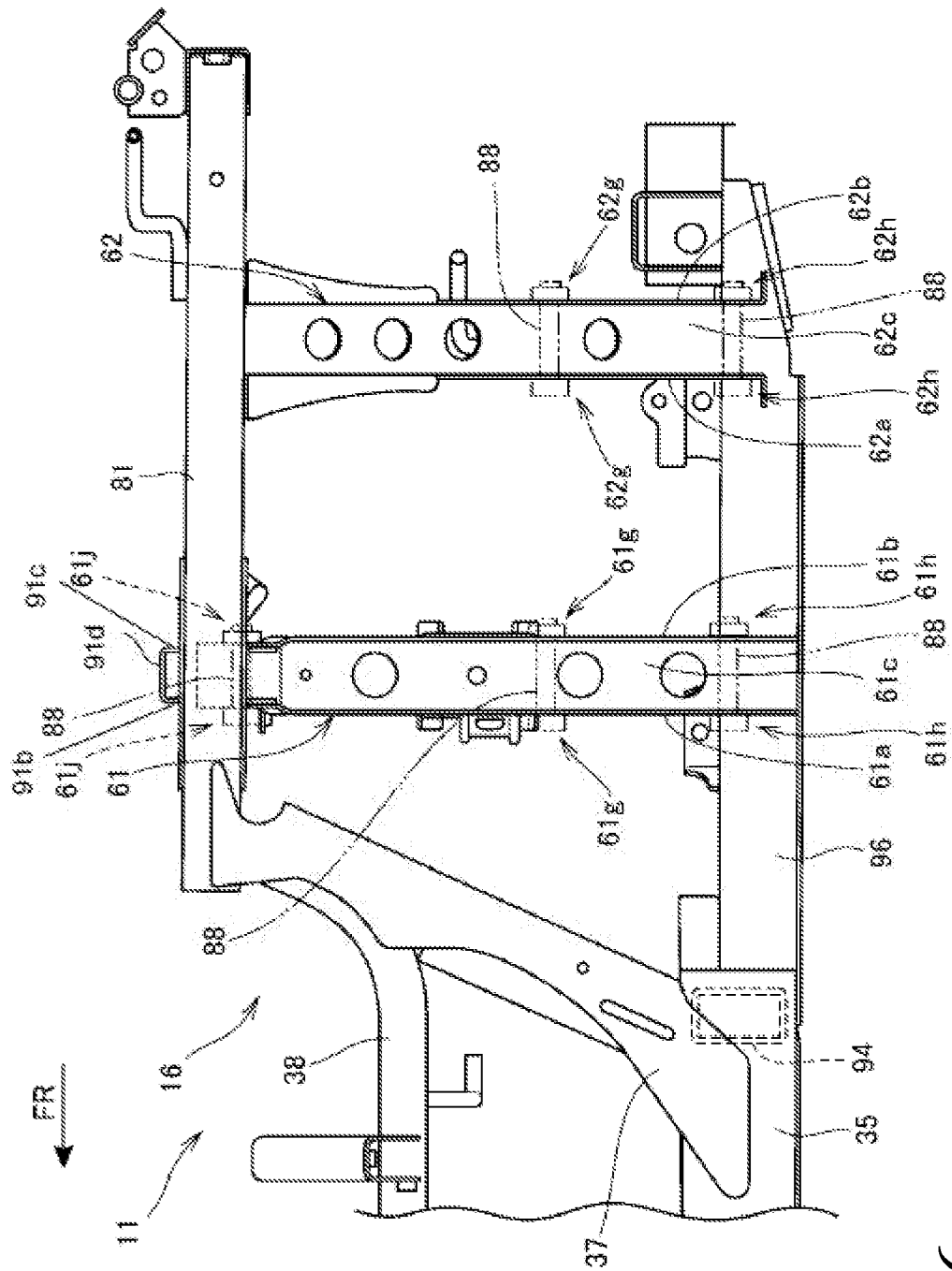
FIG. 6 is a left side view illustrating the main section of a rear frame.

FIG. 6 is a left side view illustrating the main section of the rear frame 16. The left and right middle lower main frames 35 and 35 (only the middle lower main frame 35 of the viewable side is illustrated) are connected by a middle lower cross member 94. A left and right pair of rear lower main frames 96 and 96 (only the rear lower main frame 96 of the viewable side is illustrated) extends toward the rear of the vehicle body from the intermediate part in the vehicle width direction of the middle lower cross member 94. The spacing in the vehicle width direction of the left and right rear lower main frames 96 and 96 is narrower than the spacing in the vehicle width direction of the middle lower main frames 35 and 35. This is because the rear suspension 17 and the rear wheels 18 are disposed on the outer side of each of the rear lower main frames 96 and 96. The left and right rear lower main frames 96 and 96 are coupled by a plurality of cross members.

The upper end of the front rear side frame 61 is connected to the front rear cross member 91 that extends in the vehicle width direction, the lower end is connected to the rear lower main frame 96, and the front rear side frame 61 is disposed substantially vertical when viewed from the side. The front rear side frame 61 is a U-shaped cross-sectional member that opens to the outside in the vehicle width direction, and is integrally formed by two side walls 61a and 61b and a bottom wall 61c that connects the side walls 61a and 61b.

The upper end of the back rear side frame 62 is connected to the rear upper main frame 81, the lower end is connected to the rear lower main frame 96, and the back rear side frame 62 is disposed substantially vertical when viewed from the side. The back rear side frame 62 is a U-shaped cross-sectional member that opens to the outside in the vehicle width direction, and is integrally formed by two side walls 62a and 62b and a bottom wall 62c that connects the side walls 62a and 62b.

Figure 7:
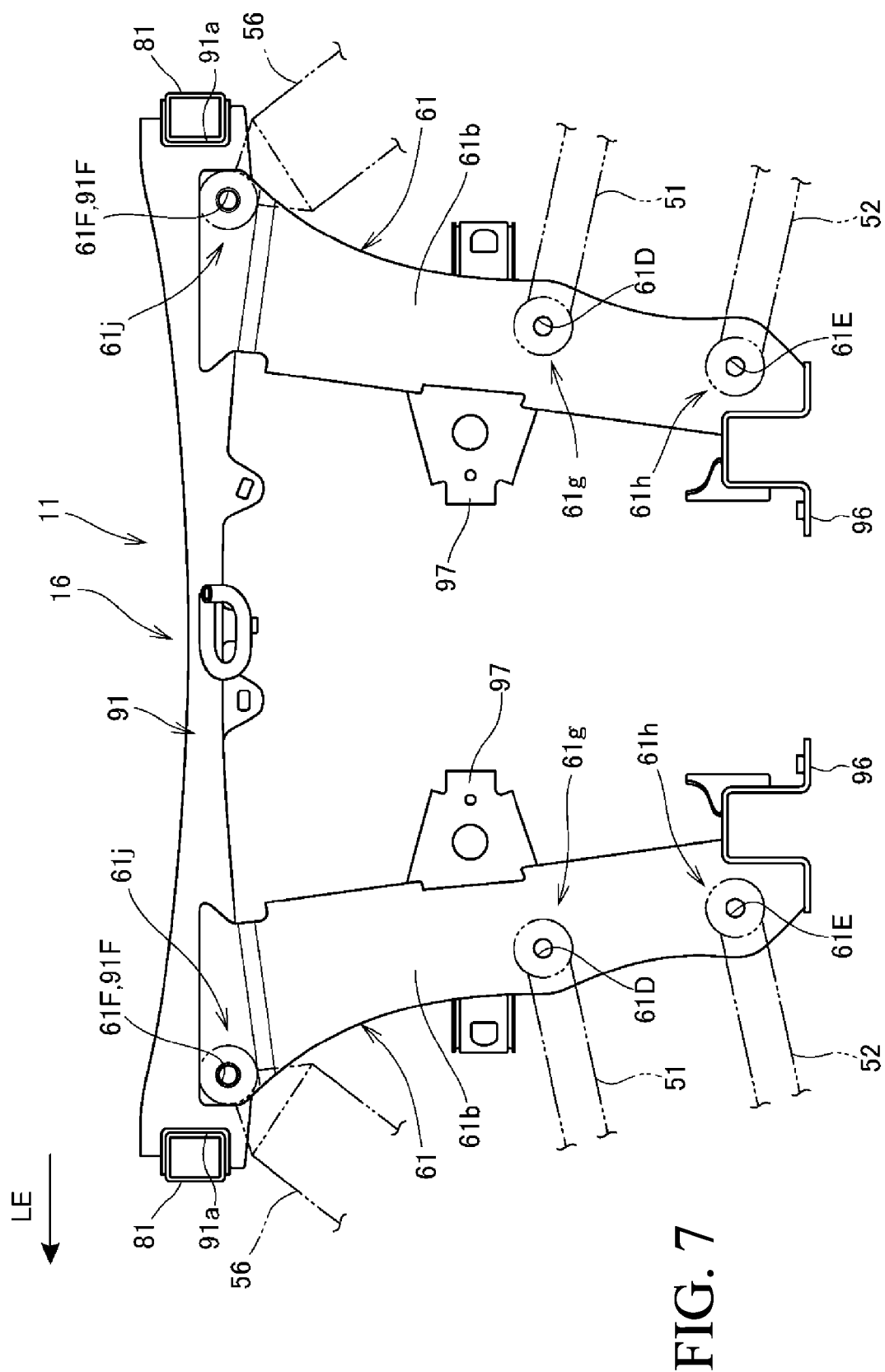
FIG. 7 is a main section rear view illustrating a rear suspension mounting structure of the rear frame.

FIG. 7 is a main section rear view illustrating a rear suspension mounting structure of the rear frame 16. The left and right front rear side frames 61 and 61 have upper ends thereof connected to an end portion of the front rear cross member 91 adjacent to the rear upper main frames 81 and 81, and the lower ends are connected to the rear lower main frames 96 and 96. The front rear side frame 61 is inclined so that the upper end is positioned more outside in the vehicle width direction than the lower end. Note that reference symbol 97 is a support bracket attached to the inside of the front rear side frame 61 for supporting the final drive unit 67 (see FIG. 5).

The front rear side frame 61 has shaft insertion holes 61D, 61D, 61E, 61E, 61F, and 61F (only the shaft insertion holes 61D, 61E, and 61F on the viewable side are illustrated) that pass through the coupling shaft 88 (see FIGS. 2 and 6) and are formed in the side walls 61a and 61b (only the side wall 61b is illustrated). The coupling shaft 88 (see FIGS. 2 and 6) for coupling each end portion of the upper arm 51 in the shaft insertion holes 61D and 61D, of the lower arm 52 in the shaft insertion holes 61E and 61E, and of the rear cushion unit 56 in the shaft insertion holes 61F and 61F is passed through. The coupling shaft 88 is a bolt-shaped member, and a nut 89 (see FIG. 2) is screwed to the tip end portion. The edges of the shaft insertion holes 61D, 61D, 61E, 61E, 61F, and 61F each configure attachment portions 61g and 61g (only the attachment portion 61g of the viewable side is illustrated) of the upper arm 51, attachment portions 61h and 61h (only the viewable side attachment portion 61h is illustrated) of the lower arm 52, and the attachment portions 61j and 61j (only the attachment portion 61j of the viewable side is illustrated) of the rear cushion unit 56.

The shaft insertion holes 61F and 61F described above are formed in a portion where the front rear cross member 91 and the front rear side frame 61 overlap. The shaft insertion holes 61F and 61F overlap with the shaft insertion holes 91F and 91F formed on the front rear cross member 91, and the coupling shaft 88 of the rear cushion unit 56 is passed through the shaft insertion layers 61F, 91F, 91F, and 61F. In this manner, in the portion where the front rear cross member 91 and the front rear side frame 61 overlap, the strength and rigidity are increased, and by providing the shaft insertion holes 61F, 91F, 91F, and 61F in this portion, the load generated in the rear cushion unit 56 can be sufficiently supported.

As illustrated in FIG. 6, the front rear cross member 91 is a U-shaped cross-sectional member opened on the lower part and is formed by two sides portions 91 b and 91 c and a top portion 91 d that connects the side portions 91 b and 91 c. As shown in FIG. 7, a recessed portion 91 a is formed on both end portions thereof, and the front rear cross member 91 is coupled with the rear upper main frame 81 so that the rear upper main frame 81 is fit to the recessed portion 91 a With this type of coupling structure, coupling strength can be increased.

As illustrated in FIG. 2 and FIG. 7, mounting precision is improved for the entire rear suspension 17 because the upper arm 51, the lower arm 52, and the rear cushion unit 56 are attached to one front rear side frame 61. Further, to simplify the support structure of the rear suspension 17, the support structure of the rear suspension 17 is lightweight and can easily achieve strength and rigidity in the present embodiment compared to a structure that supports the rear suspension in a complex manner with many elements.

Figure 8:
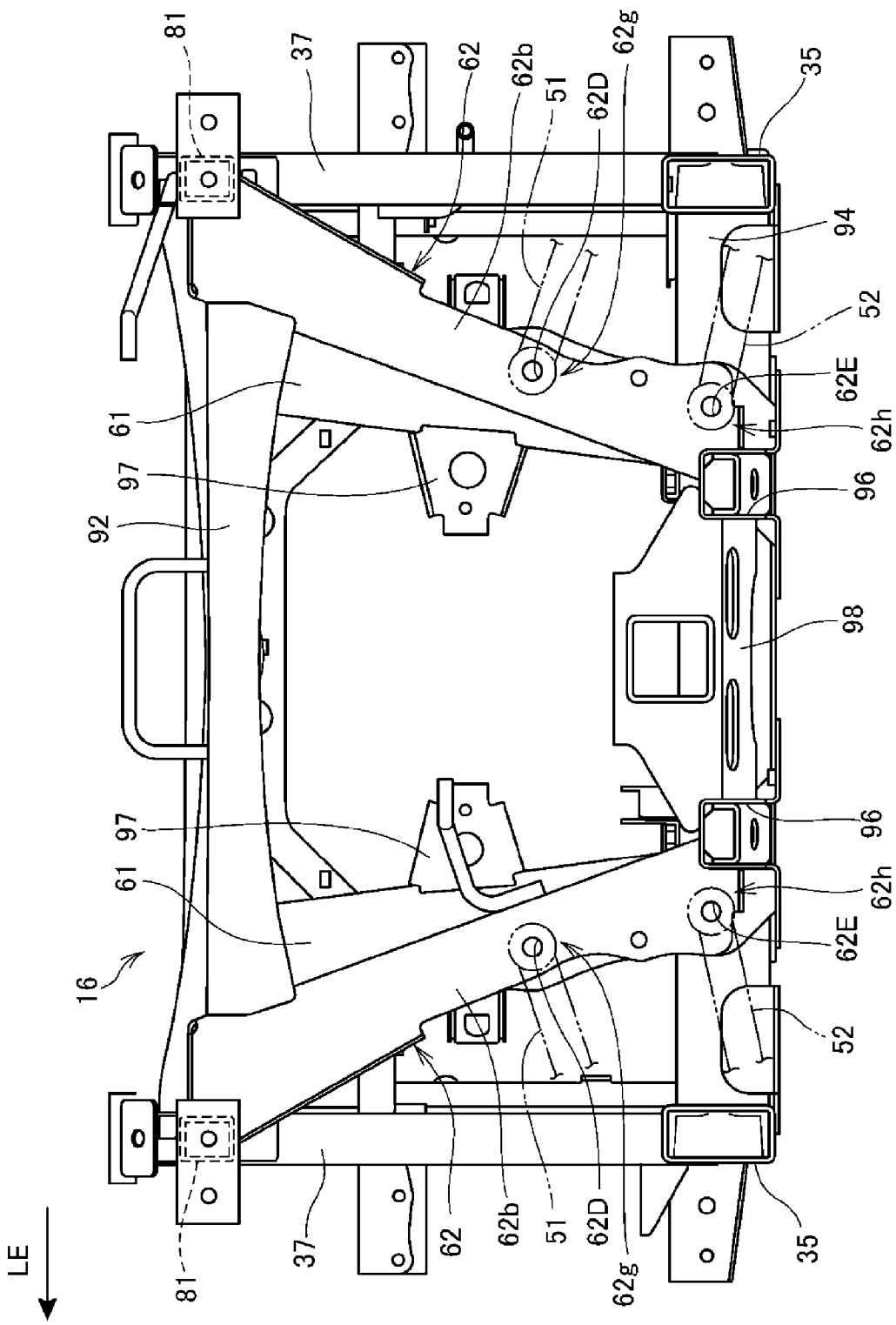
FIG. 8 is a rear view illustrating the rear frame.

FIG. 8 is a rear view illustrating the rear frame 16. The left and right back rear side frames 62 and 62 have the upper ends connected to the rear upper main frames 81 and 81, and the lower ends are connected to the rear lower main frames 96 and 96. The back rear side frame 62 is inclined so that the upper end thereof is positioned more to the outside in the vehicle width direction than the lower end. Further, the angle of inclination of the back rear side frame 62 is larger than the angle of inclination of the front rear side frame 61. Furthermore, the upper ends of the left and right back rear side frames 62 and 62 are connected by the back rear cross member 92.

The back rear side frame 62 has shaft insertion holes 62D, 62D, 62E, and 62E (only the shaft insertion holes 62D and 62E of the viewable side are illustrated) that pass through the coupling shaft 88 (see FIGS. 2 and 6) and are opened on the side walls 62a and 62b (only the side wall 62b is illustrated). The coupling shaft 88 (see FIGS. 2 and 6) for coupling each end portion of the upper arm 51 in the shaft insertion holes 62D and 62D and each end portion of the lower arm 52 in the shaft insertion holes 62E and 62E is passed through, and the nut 89 (see FIG. 2) is screwed to the tip end portion of the coupling shaft 88. The edges of the shaft insertion holes 62D, 62D, 62E, and 62E respectively configure the attachment portions 62g and 62g (only the attachment portion 62g of the viewable side is illustrated) of the upper arm 51 and the attachment portions 62h and 62h (only the attachment portion 62h of the viewable side is illustrated) of the lower arm 52. The left and right rear lower main frames 96 and 96 are connected by a rear cross member 98 extending in the vehicle width direction.

Figure 9:
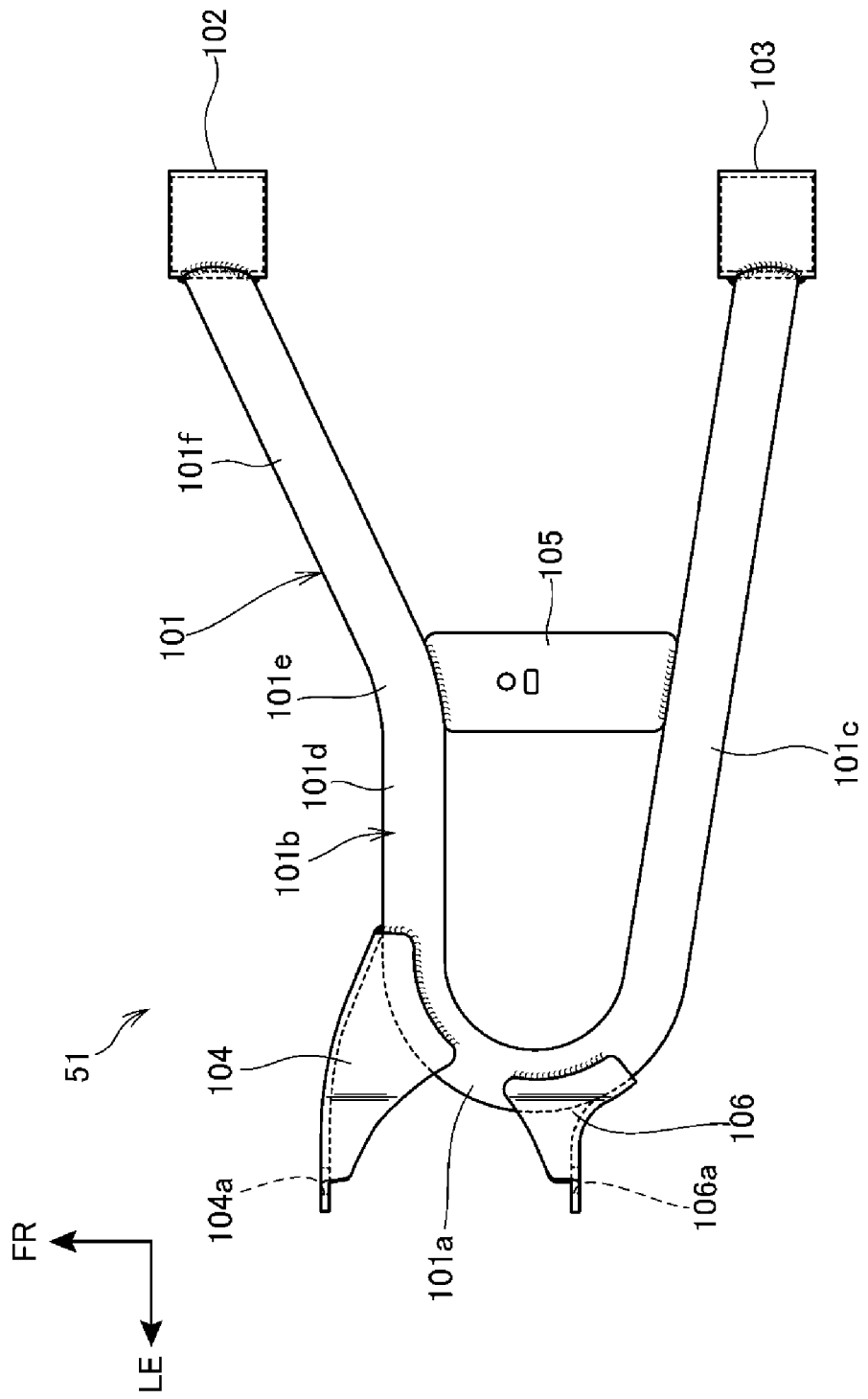
FIG. 9 is a plan view illustrating an upper arm.

FIG. 9 is a plan view illustrating the upper arm 51. The upper arm 51 is configured with an arm body 101 made with a pipe formed in a substantially U-shape, a tube shaped front collar member 102 and a rear collar member 103 attached to the end face of the U-shape, a front bracket 104 and a rear bracket 106 attached to a U-shaped folded portion 101a provided on the arm 101, and a reinforcing plate 105 attached to the center portion of the arm body 101.

The arm body 101 is integrally formed with a front arm portion 101b that becomes a U-shaped front portion, a rear arm portion 101c that becomes a U-shaped rear portion, and the folded portion 101a that connects the front arm portion 101b and the rear arm portion 101c. The front arm portion 101b is integrally configured with a first linear portion 101d extending substantially linearly in the vehicle width direction and a second linear portion 101f connected to the first linear portion 101d via a flexure 101e and extending linearly inward and obliquely forward in the vehicle width direction. As described above, by disposing the first linear portion 101d of the front arm portion 101b more to the rear of the vehicle than the second linear portion 101f, the front-back direction clearance between the rear cushion unit 56 (see FIGS. 2 and 5), which is positioned in the front of the upper arm 51, and the upper arm 51 can be ensured.

In the front collar member 102 and the rear collar member 103, the coupling shaft 88 passes through each via a rubber bushing (not illustrated), and the upper arm 51 is coupled to the front rear side frame 61 (see FIG. 2) and the back rear side frame 62 (see FIG. 2). The front bracket 104 and the rear bracket 106 are coupled to the knuckle 83 (see FIG. 5) via a coupling shaft 108 (see FIG. 2). Note that reference numerals 104a and 106a are shaft insertion holes formed on the front bracket 104 and the rear bracket 106 to pass the coupling shaft 108 that is coupled to the knuckle 83. Both ends of the reinforcing plate 105 are attached to the flexure 101e of the arm body 101 and to the rear arm portion 101c.

Figure 10:
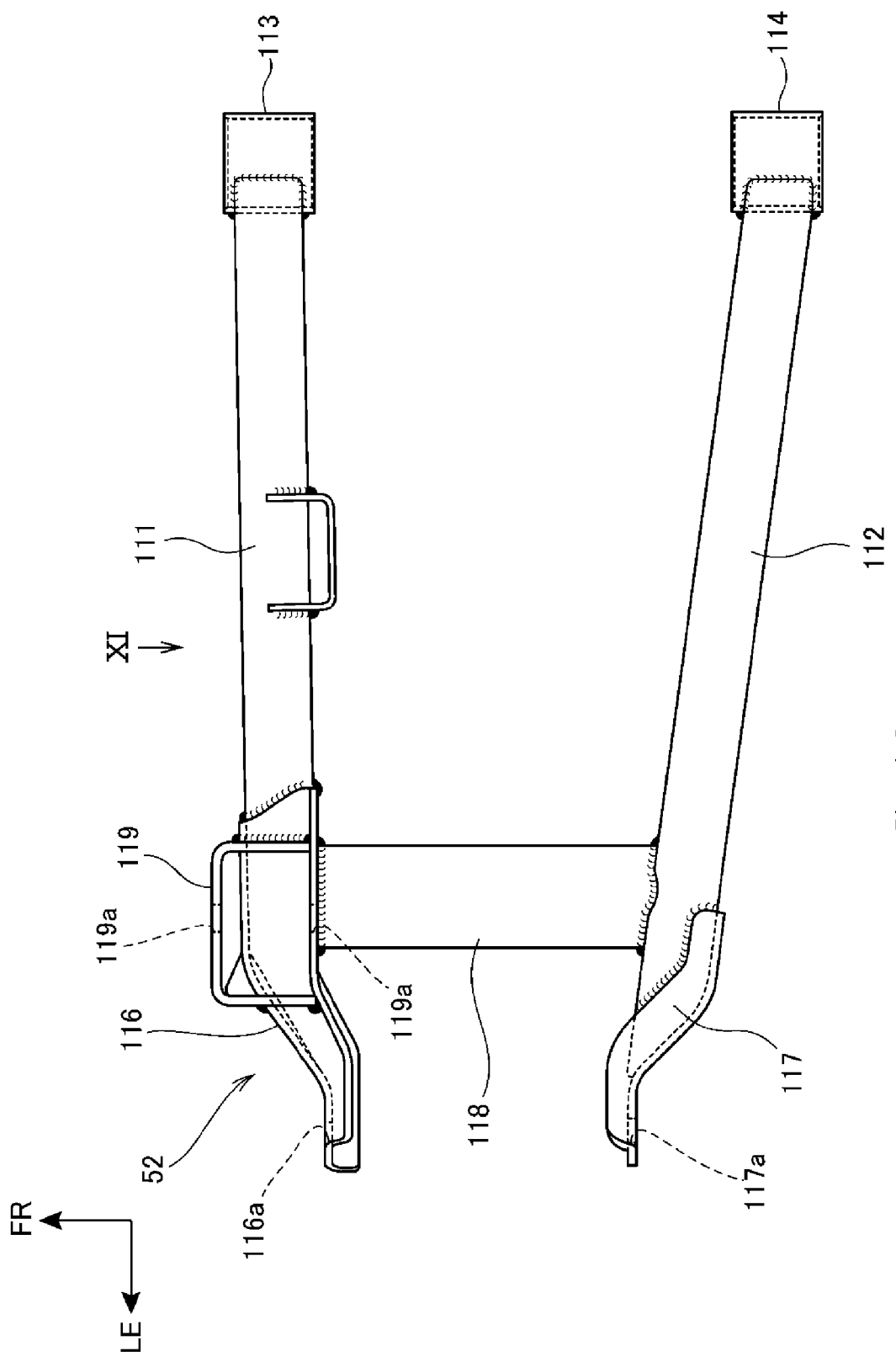
FIG. 10 is a plan view illustrating a lower arm.

FIG. 10 is a plan view illustrating the lower arm 52. The lower arm 52 is configured with a front arm 111 and a rear arm 112 made up of a straight pipe extending substantially in the vehicle width direction, a tube shaped front collar member 113 and a rear collar member 114 attached to the end face in the inner vehicle width direction of the front arm 111 and the rear arm 112, a front bracket 116 attached to the tip end portion of the front arm 111, and a rear bracket 117 attached to the tip end portion of the rear arm 112. The lower arm 52 also includes a middle arm 118, made up of a straight pipe attached so as to extend substantially in the front-back direction across each of the front bracket 116 and the rear arm 112, and an upper bracket 119 attached to the upper portion of the front bracket 116. In the front collar member 113 and the rear collar member 114, the coupling shaft 88 (see FIG. 2) passes through each via a rubber bushing (not illustrated), and the lower arm 52 is coupled to the front rear side frame 61 (see FIG. 2) and the back rear side frame 62 (see FIG. 2).

The front bracket 116 and the rear bracket 117 are coupled to the knuckle 83 (see FIG. 5) via a coupling shaft 121 (see FIG. 2). Note that reference numerals 116a and 117a are shaft insertion holes formed on the front bracket 116 and the rear bracket 117 to pass the coupling shaft 121 that is coupled to the knuckle 83. The upper bracket 119 is coupled to the lower end portion 56b (see FIG. 4) of the rear cushion unit 56 via a coupling shaft 124 (see FIG. 4). A nut (not illustrated) is screwed to the end portion of the coupling shaft 124. Note that the reference numerals 119a and 119a are shaft insertion holes formed on the upper bracket 119 to couple the lower end portion 56b of the rear cushion unit 56. In this manner, interference between the rear cushion unit 56 and the drive shaft 66 (see FIG. 5) can be avoided by providing the upper bracket 119 on the front arm 111 side.

Figure 11:
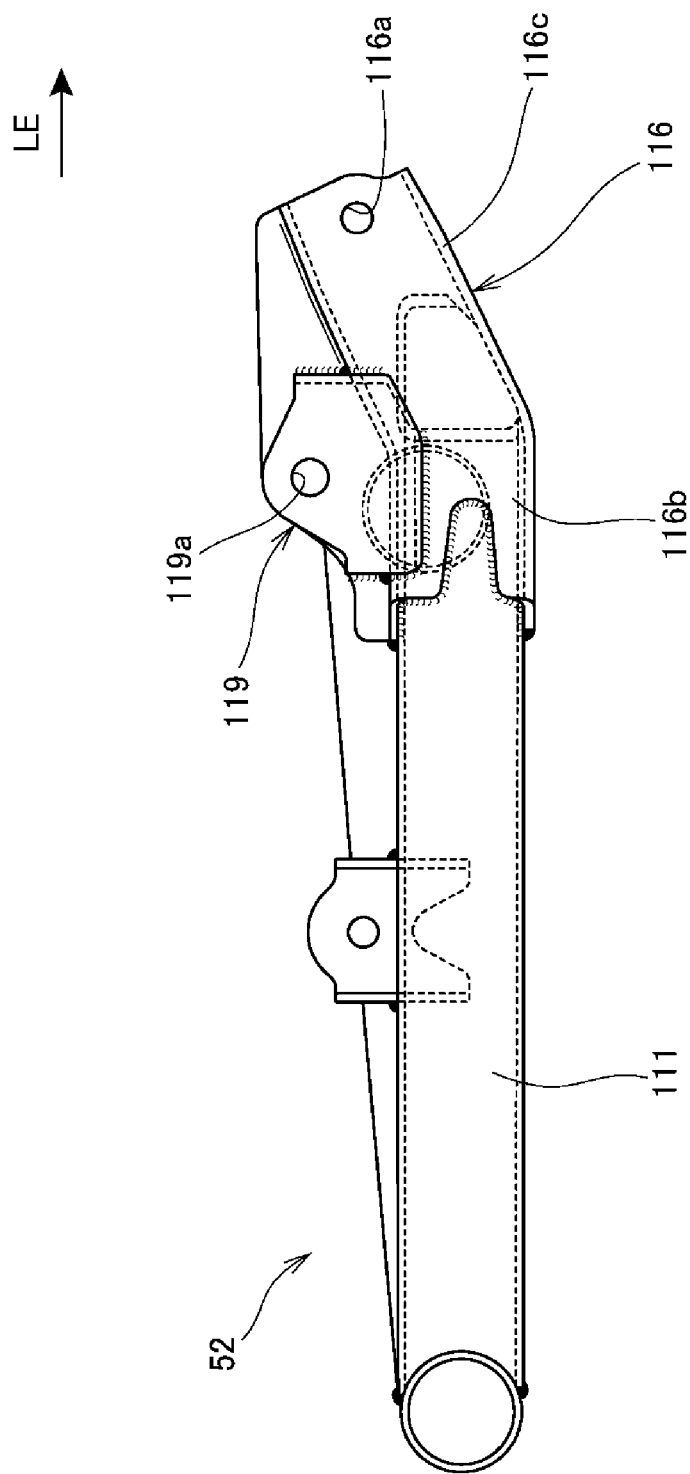
FIG. 11 is a view along the arrow XI of FIG. 10.

FIG. 11 is a view along the arrow XI of FIG. 10. The front bracket 116 of the lower arm 52 is integrally formed with a base portion 116b attached to the tip end portion of the front arm 111 and a bracket inclined portion 116c that extends outward and obliquely upward from the end portion of the base portion 116b. The upper bracket 119 is attached across the base portion 116b and the bracket inclined portion 116c, and the shaft insertion hole 119a is formed on the upper bracket 119 on the upper side of the base portion 116b for coupling via the lower end portion 56b (see FIG. 4) of the rear cushion unit 56 (see FIG. 4) and the coupling shaft 124 (see FIG. 4). A shaft insertion hole 116a is formed to couple the knuckle 83 (see FIG. 5) on the tip end portion of the bracket inclined portion 116c. In this manner, the welding length can be increased and coupling strength can be improved by attaching by welding, for example, the upper bracket 119 across the base portion 116b of the front bracket 116 and the bracket inclined portion 116c.

As described in FIGS. 1, 2, 4, and 7, the off-road vehicle 10 is provided with the body frame 11 that supports the final drive unit 67 and the rear suspension 17 as a suspension device. The rear suspension 17 absorbs shock with the rear cushion unit 56 disposed between the rear wheels 18 and the body frame 11 while supporting the rear wheels 18 as driving wheels by the upper arm 51 and the lower arm 52 that move up and down, and the drive shaft 66 transmits a driving force extending from the final drive unit 67 to the rear wheels 18. The body frame 11 that configures generally rectangular parallelepiped sides enclosing the area around the final drive unit 67 is provided with a front rear side frame 61 as a frame member. The front rear side frame 61, which extends vertically the left and right of either the front or back of the final drive unit 67, supports the upper arm 51, the lower arm 52, and the rear cushion unit 56.

In this configuration, the drive shaft 66 and the rear cushion unit 56 can be disposed off-set in the vehicle longitudinal direction, and the attachment position of the rear cushion unit 56 can be lowered. Further, by lowering the attachment position of the rear cushion unit 56, the seat and bed provided on the upper side of the attachment position can be lowered. Therefore, a low center of gravity can be achieved for the overall off-road vehicle 10. In addition, by attaching the upper arm 51, the lower arm 52, and the rear cushion unit 56 to one front rear side frame 61, the mounting precision of the entire rear suspension 17 can be improved in the present embodiment compared to prior art where the cushion unit is attached to a member separate from the frame member with the upper arm and the lower arm attached. Because the support structure of the rear suspension 17 is simple in this manner, the support structure of the rear suspension 17 can be improved, and the strength and rigidity necessary for the support structure of the rear suspension 17 is easily achieved.

Further, as illustrated in FIGS. 2, 6, and 7, the front rear side frame 61 is formed in a U-shaped cross-section opening to the outside in a vehicle width direction, and each coupling shaft 88 that couples the upper arm 51, the lower arm 52, and the rear cushion unit 56 are inserted across the pair of opposing walls 61a and 61b of the U-shape. Therefore, an attachment structure of the upper arm 51, the lower arm 52, and the rear cushion unit 56 can be easily formed, and cost can be suppressed by merely inserting the coupling shaft 88 into the opposing walls 61a and 61b that form the U-shape of the front rear side frame 61.

Further, as illustrated in FIG. 7, the top end of the front rear side frame 61 is coupled to the front rear cross member 91 as a U-shaped cross-sectional cross member that opens downward and extends left and right to connect the rear upper main frames 81 and 81 as a left and right pair of upper frame members that extend front to back above the left and right parts of the final drive unit 67, and the attachment portion 61j of the rear cushion unit 56 is provided in a location where the front rear side frame 61 and the front rear cross member 91 respectively overlap. Thus, a load of the rear cushion unit 56 can be supported in a high strength location where the front rear side frame 61 and the front rear cross member 91 overlap. Therefore, deformation of the body frame 11 can be suppressed.

Further, the shaft insertion hole 61F and the attachment portion 61j for attaching the rear cushion unit 56 are provided at a position at substantially the same height as a lower surface but more to the inner side than the inner surface in the vehicle width direction of the left and right pair of rear upper main frames 81 and 81. Therefore, the length of the rear cushion unit 56 can be lengthened, and suspension performance can be improved.

Furthermore, as illustrated in FIGS. 5 and 9, because a portion adjacent to the rear cushion unit 56 of the upper arm 51 is bent to the drive shaft 66 side when viewed from the top surface, the rear cushion unit 56 can get close to the center of the rear wheels 18 in the vehicle longitudinal direction, and suspension performance can be improved.

The embodiments described above are merely one form of the present disclosure, and variations may be freely applied within a scope that does not deviate from the essence of the present disclosure.

In addition, the present disclosure is applied to a four-wheel off-road vehicle, but it is not limited thereto, and may also be applied to a three-wheel off-road vehicle with two rear wheels.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An off-road vehicle comprising: a body frame supporting a final drive unit and a suspension device; the suspension device that supports a driving wheel with an upper arm and a lower arm so as to be vertically moveable, and absorbs shock with a cushion unit disposed between the driving wheel and the body frame; and a drive shaft that transmits a driving force extending from the final drive unit to the driving wheel; wherein the body frame configuring generally rectangular parallelepiped sides enclosing an area around the final drive unit includes a frame member, and the frame member that vertically extends left and right of one side of either a front side or a back side of the final drive unit supports the upper arm, the lower arm, and the cushion unit, wherein the frame member is formed in a U-shaped cross-section opening to the outside in a vehicle width direction, and coupling shafts coupling the upper arm, the lower arm, and the cushion unit are each inserted across a pair of opposing walls of the U-shape.

2. The off-road vehicle of claim 1, wherein a top end of the frame member is coupled to a cross member, the cross member comprising a U-shaped cross-section opening downward and extending left and right connecting a pair of left and right upper frame members that extend longitudinally above left and right sides of the final drive unit; and an attachment portion of the cushion unit is provided in a location where the frame member and the cross member respectively overlap.

3. The off-road vehicle of claim 2, wherein the attachment portion of the cushion unit is provided in a position at substantially the same height as a lower surface but more to an inner side than an inner surface in the vehicle width direction of the pair of left and right upper frame members.

4. The off-road vehicle of claim 1, wherein a portion adjacent to the cushion unit of the upper arm is bent to the drive shaft side when viewed from a top surface.

5. A body frame for supporting a suspension device of a vehicle, the body frame comprising:
a side frame that extends vertically comprising two side walls, a bottom wall connecting the side walls, and attachment portions to attach an upper arm of the suspension device, a lower arm of the suspension device, and a cushion unit of the suspension device;
coupling shafts inserted across the side walls of the side frame coupling the upper arm, the lower arm, and the cushion unit to the attachment portions of the side frame; and
a cross member attached to a top end portion of the side frame, the cross member comprising two side portions and a top portion connecting the side portions,
wherein the cushion unit attachment portion is provided in a location where the side frame and the cross member overlap to attach the cushion unit to the side frame and the cross member.

6. The body frame of claim 5, wherein the upper arm and the lower arm are attached to the side frame so as to be vertically moveable, each arm having a first end attached to the side frame and a second end opposite the first end supporting a wheel of the vehicle.

7. The body frame of claim 6, wherein the cushion unit absorbs shock and is disposed between the side frame and the wheel of the vehicle and located to a side of the upper arm and lower arm, the cushion unit having a first end attached to the side frame and a second end opposite the first end attached to the lower arm.

8. The body frame of claim 6, wherein the side frame supports a final drive unit, the final drive unit coupled to the wheel of the vehicle through a drive shaft that transmits driving force from the final drive unit to the wheel and is positioned between the upper arm and the lower arm.

9. The body frame of claim 8, wherein the drive shaft is located above the lower arm; the upper arm is located above the drive shaft; and the cushion unit is located to a side of the lower arm, drive shaft, and the upper arm and is attached to the lower arm.

10. A suspension support structure of a vehicle comprising:
a suspension device and a body frame supporting the suspension device; the suspension device comprising an upper arm and a lower arm supporting a wheel of a vehicle and vertically movable on the body frame, and a cushion unit absorbing shock and disposed between the body frame and the wheel; and the body frame comprising a side frame with a vertically extending side member to which the upper arm, the lower arm, and the cushion device attach,
wherein each arm has a first end attached to the side member and a second end supporting the wheel, and the cushion unit has a first end attached to the side member and a second end attached to the lower arm; and the side frame comprising two side walls, a bottom wall connecting the side walls, and attachment portions to attach the upper arm, lower arm, and the cushion device, and
wherein coupling shafts are inserted across the side walls of the side frame coupling the upper arm, the lower arm, and the cushion unit to the attachment portions.

11. The suspension support structure of claim 10, further comprising a cross member attached to a top end portion of the side frame, wherein the cushion unit attachment portion is provided in a location where the side frame and the cross member overlap attaching the cushion unit to the side frame and the cross member.

12. The suspension support structure of claim 10, wherein the side frame supports a final drive unit, the final drive unit coupled to the wheel through a drive shaft that transmits driving force from the final drive unit to the wheel and is positioned between the upper arm and the lower arm.

13. The suspension support structure of claim 12, wherein the drive shaft is located above the lower arm, the upper arm is located above the drive shaft, and cushion unit is located to a side of the lower arm, the drive shaft, and the upper arm.

14. A suspension support structure of claim 10, wherein the lower arm comprises a front arm, a rear arm, and a middle arm connecting the front arm and the rear arm; and the upper arm comprises a front arm portion, a rear arm portion, and a folded portion connecting the front arm portion and the rear arm portion.

15. The suspension support structure of claim 14, wherein the front arm portion of the upper arm is configured with a first linear portion connected to the folded portion, a second linear portion, and a curved flexure connecting the first linear portion and the second linear portion such that the first linear portion is disposed more toward the rear arm portion than the second linear portion.

16. The suspension support structure of claim 15, wherein the upper arm is located above the lower arm, and the cushion unit is located to a side of the front arm of the lower arm and to a side of the first linear portion of the upper arm.

* * * * *